United States Patent

Barton

[11] Patent Number: 5,880,373
[45] Date of Patent: Mar. 9, 1999

[54] DIFFERENTIAL PRESSURE MEASURING ARRANGEMENT

[75] Inventor: Klaus-Dieter Barton, Melanchthonstrasse 2, Germany

[73] Assignee: Hartmann & Braun GmbH & Co. KG, Eschborn, Germany

[21] Appl. No.: 121,278
[22] Filed: Jul. 22, 1998

[30] Foreign Application Priority Data

Aug. 5, 1997 [DE] Germany ............... 297 13 880 U

[51] Int. Cl.⁶ ............... G01L 9/00; G01L 9/16; G01L 9/06
[52] U.S. Cl. .................. 73/754; 73/721
[58] Field of Search ............... 73/720, 721, 726, 73/727, 753, 754

[56] References Cited

U.S. PATENT DOCUMENTS 4,528,855 7/1985 Singh .................................. 73/721

Primary Examiner—William Oen
Attorney, Agent, or Firm—Michael M. Rickin

[57] ABSTRACT

An arrangement for measuring high pressure differences. The arrangement has a differential pressure sensor made using thin film technology. The arrangement has a metallic layer in which measuring resistors are arranged. The sensitive structures of the measuring resistors are kept away from aggressive measuring media by encapsulation.

12 Claims, 1 Drawing Sheet

DIFFERENTIAL PRESSURE MEASURING ARRANGEMENT

FIELD OF THE INVENTION

This invention relates to a differential pressure measuring arrangement having a differential pressure sensor made using thin film technology for measuring high pressure differences.

DESCRIPTION OF THE PRIOR ART

Known differential pressure measuring arrangements with differential pressure sensors made using glass-silicon technology or on a semiconductor basis are unsuitable as such for measuring high pressure differences on account of the strength properties of the materials used.

Pressure sensors made using thin film technology are generally known and commercially available as such and comprise a metallic cylindrical diaphragm body with a tubular fastening portion and a pressure-sensitive measuring diaphragm. The measuring diaphragm is subjected on one side to a special manufacturing process, in which the measuring diaphragm is initially ground to a defined thickness and a desired surface finish. With methods known per se from the field of thin film technology, a structure of successive layers is then applied to the measuring diaphragm, comprising an electrically insulating layer, a thin metallic layer, in which patterns of measuring resistors are arranged, and a final passivation layer, which leaves exposed the access points to metallic terminal areas of the measuring resistors. The measuring resistors are wired to one another in the manner of a Wheatstone bridge, known per se, and are arranged in the regions of the measuring diaphragm where strain is intensive.

The use of sensors designed as thin-film measuring resistors in a measuring arrangement for measuring pressure as the physical variable is known per se from the company publication "Metall- and Polysilizium-Dünnfilm-DMS-Drucksensoren" ["Metal and Polysilicon Thin-Film Strain-Gauge Pressure Sensors"] of the Baumer Electric Company, issue 11/95. In this case, the tubular fastening portion is welded to a pressure connection flange, so that the pressure of the pressure medium acts directly on the pressure connection side of the measuring diaphragm. The opposite side of the measuring diaphragm, provided with the thin-film measuring resistors, is located in a space shared with the electrical terminal and the evaluation electronics.

In the use of sensors designed as thin-film measuring resistors in a measuring arrangement for measuring differential pressure as the physical variable, the side of the measuring diaphragm provided with the thin-film measuring resistors and the evaluation electronics is bathed in the measuring medium. Consequently, the field of applications of such measuring arrangements is disadvantageously restricted to dry, gaseous and non-aggressive measuring media. Therefore, it is desirable to improve the known measuring arrangement for measuring differential pressure as the physical variable that is described above so that the arrangement is suitable for use in any measuring media.

SUMMARY OF THE INVENTION

The invention is based on a differential pressure measuring arrangement having a differential pressure sensor made using thin film technology, which sensor comprises a metallic cylindrical diaphragm body with a tubular fastening portion and a pressure-sensitive measuring diaphragm, the measuring diaphragm having on one side a structure of successive layers comprising an electrically insulating layer, a thin metallic layer, in which patterns of measuring resistors are arranged in the regions of the measuring diaphragm where strain is intensive, and a final passivation layer, which leaves exposed the access points to metallic terminal areas of the measuring resistors.

On the basis of such a differential pressure measuring arrangement, the essence of the invention is that the sensitive structures of the measuring resistors are kept away from aggressive measuring media by encapsulation.

It is specifically provided for this purpose that the cylindrical diaphragm body (1) is arranged with a gastight bushing ring (5) in a cylindrical recess of a measuring cell body (4), forming a pressure chamber at the bottom of the cylindrical recess, in such a way that the side of the measuring diaphragm (7) having the measuring resistors (8) is facing the pressure chamber at the bottom. The measuring cell body (4) has on each pressure feeding side in each case an inner pressure space, which is formed by a concave recess which is closed off by a separating diaphragm (12, 13) and is connected to the diaphragm body (1) via in each case a pressure feeding duct (14, 15). The inner pressure spaces, including the pressure chamber at the bottom, are filled with a fluid diaphragm seal. The bushing ring (5) has contact pins (9), which are arranged in an insulated manner and are connected within the pressure chamber at the bottom to the metallic terminal areas of the measuring resistors (8). The ends of the contact pins (9) remote from the pressure chamber at the bottom are connected to evaluation electronics.

The measuring medium exerts on the separating diaphragm a pressure which is transferred by the diaphragm seal through the pressure feeding duct to the measuring diaphragm. In this arrangement, every contact of the optionally aggressive measuring medium with the measuring diaphragm and the measuring resistors arranged thereupon is avoided on both sides. By suitable choice of the separating diaphragm materials and their surface finishing, any measuring medium can be applied on each side of the pressure feed while keeping the measuring system unchanged.

DESCRIPTION OF THE PREFERRED EMBODIMENT(S)

Figure 1:
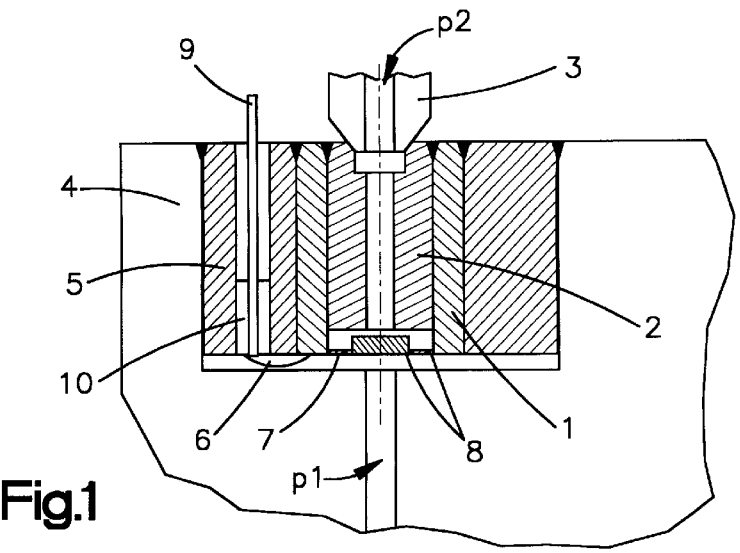
FIG. 1 shows in cutout form a sectional representation of a differential pressure measuring arrangement.
Figure 2:
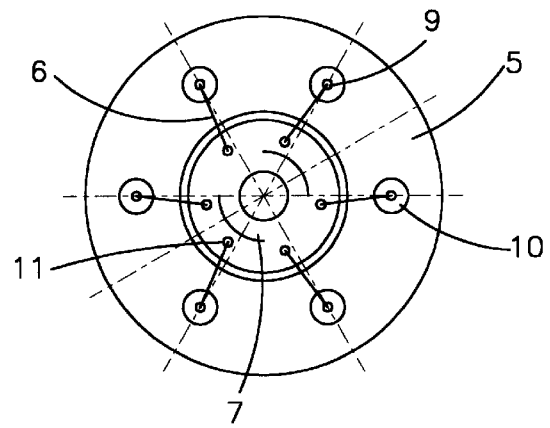
FIG. 2 shows a view from the bottom of the differential pressure measuring arrangement.
Figure 3:
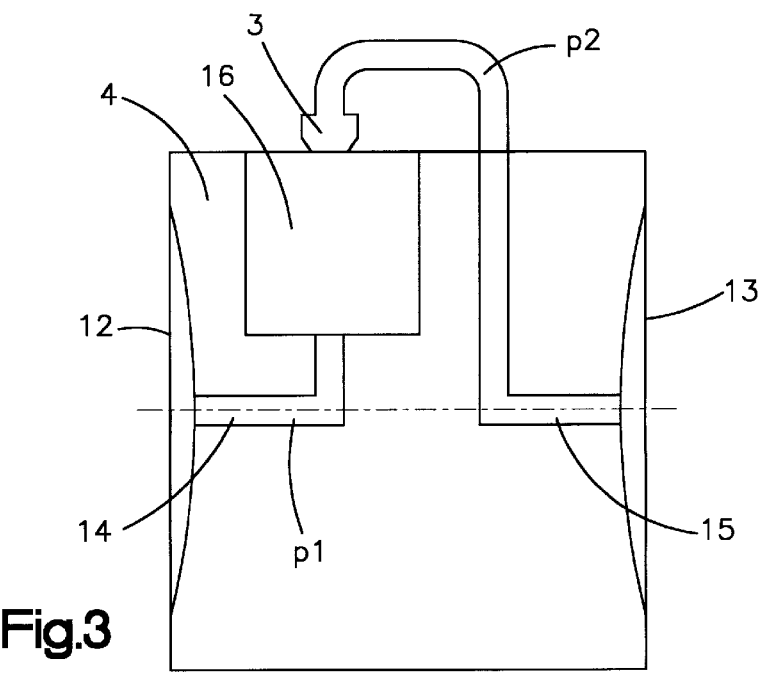
FIG. 3 shows a sectional representation of a measuring cell body.

Using the same reference numerals for the same means, a differential pressure measuring arrangement is represented in FIG. 1 in a cutout form of a sectional representation and in FIG. 2 in a view from the bottom. A cylindrically tubular diaphragm body 1 is closed on one side by a measuring diaphragm 7. On the side remote from the diaphragm body 1, the measuring diaphragm 7 has measuring resistors 8, the accessible terminal areas 11 of which are connected to contact pins 9 by means of electrical connections 6.

On the tubular fastening portion of the diaphragm body 1 there is a pressure connection 2 with the pressure feed 3, which establishes the connection to the pressure side p2. The diaphragm body 1 is surrounded by an annular glass bushing 5, by which the pressure side p1 with the measuring resistors 8 is separated from the space of evaluation electronics (not shown). The electrical connection between the measuring resistors 8 and the evaluation electronics is established by means of vitreously sealed-in contact pins 9. The contact pins 9 are electrically insulated by means of the vitreous seal 10 with the annular metallic glass bushing 5.

Bonding wires may be provided for the electrical connection 6 between the vitreously sealed-in contact pins 9 and the terminal areas 11 of the measuring resistors 8. Alternatively, it may be provided that the contact pins 9 are to be connected to the terminal areas 11 of the measuring resistors 8 by electrically conducting soldering foils.

In the inner pressure spaces p1 and p2 there is as a diaphragm seal an incompressible filling fluid, which transfers the respective pressure to the measuring diaphragm 7 via the separating diaphragms 12 and 13. The pressure p1 acts via the filling fluid on the side of the measuring diaphragm 7 which is provided with the measuring resistors 8. The pressure p2 acts on the rear side of the diaphragm via the filling fluid in the pressure feed 3, which is connected to the pressure connection 2. Alternatively, it may be provided that the pressure feed 3 is to be connected directly to the diaphragm body 1.

The connections of pressure feed 3, pressure connection 2, diaphragm body 1 and glass bushing 5 are realized by suitable welding methods known per se. It is, however, within the scope of the invention to use any other suitable connecting techniques, such as for example soldering or adhesive bonding.

According to FIG. 2, a measuring cell body 4 comprises a substantially cylindrical central body with a cylindrical recess 16 for receiving the diaphragm body 1, with the bushing ring 5 interposed, and with two concave recesses which are opposite each other on the end faces and are closed off in each case by a separating diaphragm 12 and 13, and two pressure feeds 14 and 15, which lead from the concave recesses to the diaphragm body 1 and are filled with the pressure-transferring fluid.

In addition, it may be provided that the diaphragm body 1 is equipped with an overload protection system, to protect the measuring diaphragm 7 from harmful pressure overloads. This overload protection system preferably comprises mechanical stops, the pressure connection 2 arranged in the interior of the diaphragm body 1 limiting the deflection of the measuring diaphragm 7 on the pressure side p2 and the bottom of the cylindrical recess 16 limiting the deflection of the measuring diaphragm 7 on the pressure side p1.

The differential pressure measuring arrangement is advantageously of a simple construction and can be integrated into known connecting techniques.

The filling fluid behaves in a neutral way with respect to the measuring resistors, so that any harmful effect on the measuring elements is avoided. The evaluation electronics are separated from the pressure spaces and are consequently freely accessible for the connection of continuing electrical lines, for service and monitoring operations.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A differential pressure measuring arrangement having a differential pressure sensor made using thin film technology, which sensor comprises a metallic cylindrical diaphragm body with a tubular fastening portion and a pressure-sensitive measuring diaphragm, the measuring diaphragm having on one side a structure of successive layers comprising an electrically insulating layer, a thin metallic layer, in which patterns of measuring resistors are arranged in the regions of the measuring diaphragm where strain is intensive, and a final passivation layer, which leaves exposed the access points to metallic terminal areas of the measuring resistors wherein the cylindrical diaphragm body (1) is arranged with a gastight bushing ring (5) in a cylindrical recess of a measuring cell body (4), forming a pressure chamber at the bottom of the cylindrical recess (16), in such a way that the side of the measuring diaphragm (7) having the measuring resistors (8) is facing the pressure chamber at the bottom, the measuring cell body (4) has on each pressure feeding side in each case an inner pressure space, which is formed by a concave recess which is closed off by a separating diaphragm (12, 13) and is connected to the diaphragm body (1) via in each case a pressure feeding duct (14, 15), the inner pressure spaces, including the pressure chamber at the bottom, are filled with a fluid diaphragm seal, the bushing ring (5) has contact pins (9), which are arranged in an insulated manner and are connected within the pressure chamber at the bottom to the metallic terminal areas (11) of the measuring resistors (8), and the ends of the contact pins (9) remote from the pressure chamber at the bottom are connected to evaluation electronics.

2. The differential pressure measuring arrangement as claimed in claim 1, wherein the bushing ring (5) consists of metal.

3. The differential pressure measuring arrangement as claimed in claim 1 wherein the contact pins (9) are vitreously sealed-in in the bushing ring (5).

4. The differential pressure measuring arrangement as claimed in claim 2 wherein the contact pins (9) are vitreously sealed-in in the bushing ring (5).

5. The differential pressure measuring arrangement of claim 1 wherein the electrical connection between the contact pins (9) and the metallic terminal areas (11) of the measuring resistors (8) is formed by bonding wires.

6. The differential pressure measuring arrangement of claim 2 wherein the electrical connection between the contact pins (9) and the metallic terminal areas (11) of the measuring resistors (8) is formed by bonding wires.

7. The differential pressure measuring arrangement of claim 3 wherein the electrical connection between the contact pins (9) and the metallic terminal areas (11) of the measuring resistors (8) is formed by bonding wires.

8. The differential pressure measuring arrangement of claim 4 wherein the electrical connection between the contact pins (9) and the metallic terminal areas (11) of the measuring resistors (8) is formed by bonding wires.

9. The differential pressuring measuring arrangement of claim 1 wherein the electrical connection between the contact pins (9) and the metallic terminal areas (11) of the measuring resistors (8) is formed by electrically conductive soldering foil.

10. The differential pressuring measuring arrangement of claim 2 wherein the electrical connection between the contact pins (9) and the metallic terminal areas (11) of the measuring resistors (8) is formed by electrically conductive soldering foil.

11. The differential pressuring measuring arrangement of claim 3 wherein the electrical connection between the contact pins (9) and the metallic terminal areas (11) of the measuring resistors (8) is formed by electrically conductive soldering foil.

12. The differential pressuring measuring arrangement of claim 4 wherein the electrical connection between the contact pins (9) and the metallic terminal areas (11) of the measuring resistors (8) is formed by electrically conductive soldering foil.

* * * * *